(12) United States Patent
Prentkowski

(10) Patent No.: US 6,840,544 B2
(45) Date of Patent: Jan. 11, 2005

(54) RESTRAINT SYSTEM TENSIONING DEVICE WITH LOAD LIMITING CAPABILITY

(75) Inventor: David Prentkowski, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 17 days.

(21) Appl. No.: 10/299,342

(22) Filed: Nov. 19, 2002

(65) Prior Publication Data

US 2004/0094946 A1 May 20, 2004

(51) Int. Cl.[7] .............................................. B60R 22/195
(52) U.S. Cl. ...................... 280/806; 60/635; 188/374; 297/480
(58) Field of Search ................. 280/806, 805; 297/480, 472; 60/632, 635, 638; 188/374

(56) References Cited

U.S. PATENT DOCUMENTS 5,358,275 A * 10/1994 Fohl ........................... 280/806
5,568,940 A * 10/1996 Lane, Jr. ..................... 280/806
6,676,161 B2 * 1/2004 Schwald ...................... 280/806

* cited by examiner

Primary Examiner—Peter C. English
(74) Attorney, Agent, or Firm—Markell Seitzman

(57) ABSTRACT

A belt-tensioning device for an occupant restraint is provided, designed to tension a belt (101) about an occupant at the onset of a vehicle collision, and to provide a measure of controlled force dissipation as the occupant loads the belt during the collision. In a preferred form, a tensioning member (122) moves in one direction (124) to tighten a belt about a vehicle occupant at the onset of a collision, and a braking device (130a, 130b) is configured to apply a controlled braking force to movement of the tensioning member in the opposite direction after the tensioning member has tightened the belt about the vehicle occupant. An array of braking members (130a, 130b) applies different levels of braking force to movement of the tensioning member in the opposite direction, thereby providing controlled braking force to movement of the tensioning member in the opposite direction.

4 Claims, 3 Drawing Sheets

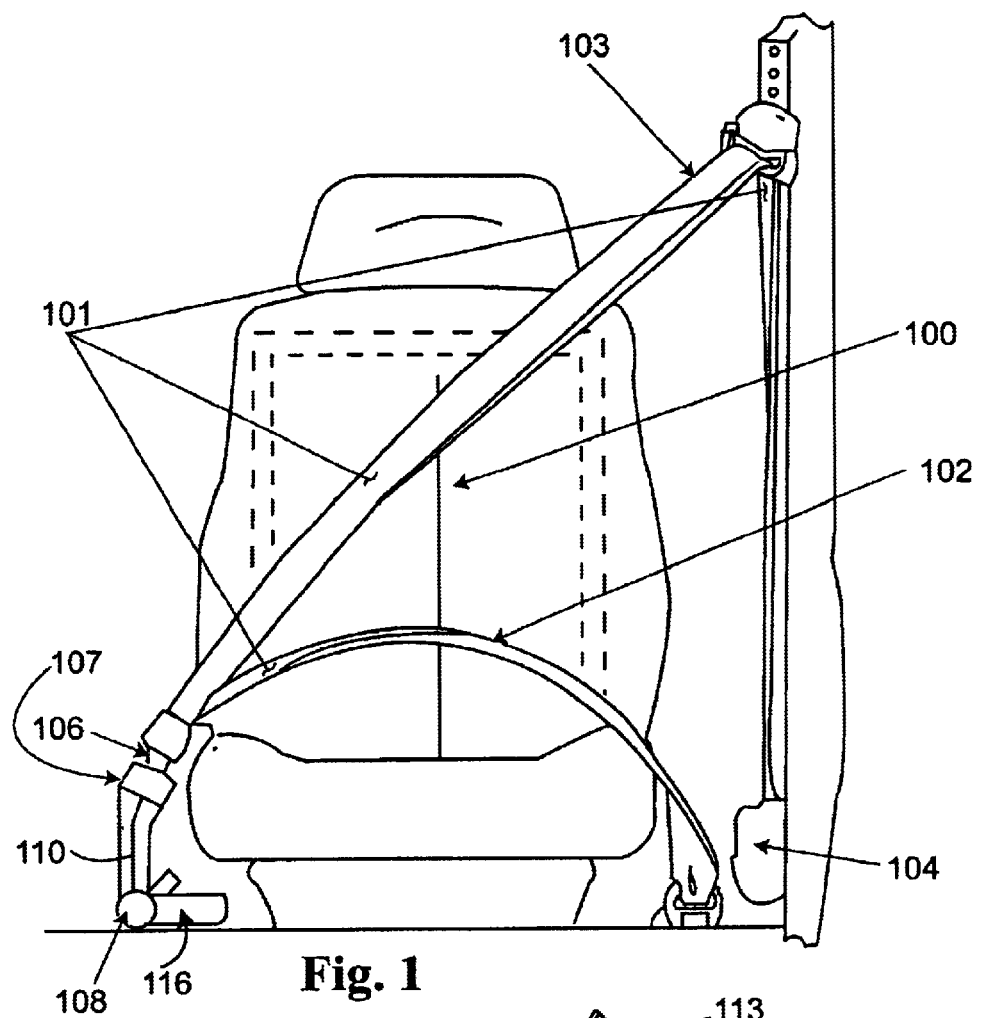
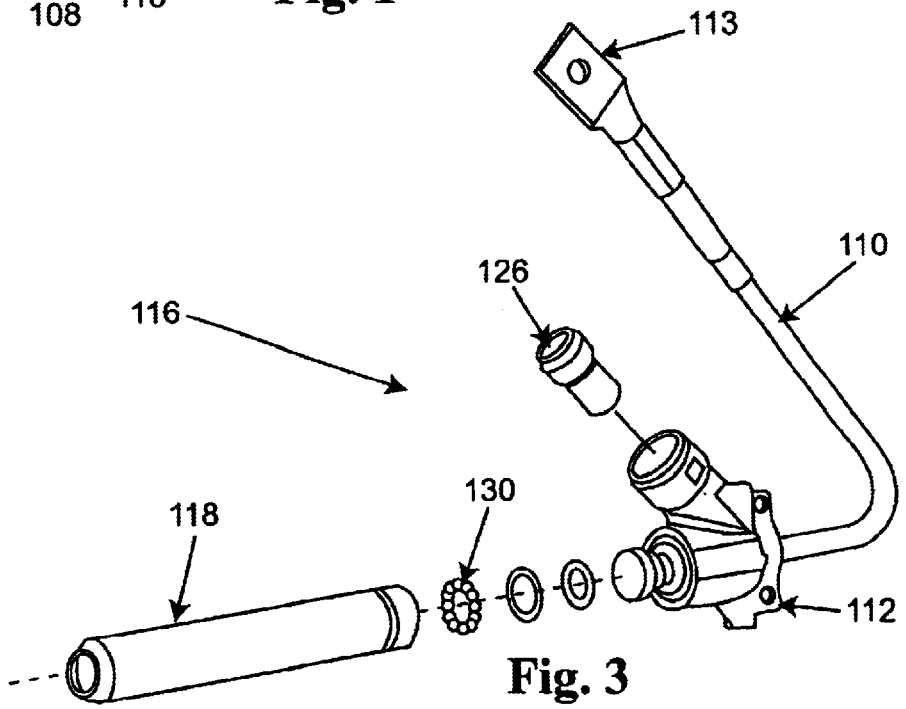

RESTRAINT SYSTEM TENSIONING DEVICE WITH LOAD LIMITING CAPABILITY

BACKGROUND AND SUMMARY OF THE INVENTION

The present invention relates to a tensioning device (also referred to as a "belt tightener") for an occupant restraint such as a seat belt and/or shoulder harness.

A typical occupant restraint system for a vehicle comprises a belt system anchored to structural parts of the vehicle such as the floor, a pillar such as a B pillar or to a seat frame. Where the restraint system includes a shoulder harness, the shoulder harness typically extends through a web guide that is coupled to a structural part of the vehicle such as the B pillar or the seat frame. A retractor, often called an "ELR or emergency locking retractor," is part of the restraint system. The retractor allows payout of the belt in response to movement of the vehicle occupant during normal vehicle operation. However, at the onset of a crash, the retractor becomes automatically locked, to restrain further belt payout, and to keep the occupant in her or his seat. Invariably the retractor is not capable of eliminating seat belt slack about the occupant for a number of known factors.

Recently, it has been proposed to design an occupant restraint system with a tensioning device (also referred to as a "belt tightener" or "pretensioner") and/or a separate load-limiting device, to better control the manner in which force(s) on an occupant are applied during a vehicle collision. Specifically, a tensioning device applies a positive force to the belt immediately at the onset of a collision, to tighten the belt against the occupant. A load-limiting device acts between the belt or retractor and a structural part of the vehicle and absorbs kinetic energy of an occupant in a controlled manner as the occupant loads the restraint during the collision. The load-limiting device can also be incorporated within the tensioning device. When a tensioning device/belt tightener and load-limiting device are combined into an occupant restraint system, the tensioning device reduces residual slack in the seat belt system at the onset of a collision and the load-limiting device absorbs kinetic energy of an occupant in a controlled manner as the occupant loads the restraint during the collision.

U.S. Pat. No. 6,186,549 B1 discloses a known construction for a vehicle seat belt tensioning device. A piston is disposed in a cylinder, and at the onset of a collision is driven in a predetermined direction to tighten the belt about a vehicle occupant. The belt-tensioning device of that patent includes a one-way clutch mechanism. This one-way clutch mechanism includes an array of metal balls that surround a sleeve of the piston of the tensioning device. The annular array of metal balls is carried with the piston when the piston is driven in the predetermined direction. When the piston reaches the end of its stroke in the predetermined direction, and the seat belt has been tightened about the vehicle occupant, force applied by the occupant to the tensioning device will cause the array of metal balls to be immediately driven outward into engagement with the cylinder, thereby virtually instantaneously locking the piston against movement in a return direction. Thus, with this type of belt tensioning device, once the tensioning device has tightened the belt about the vehicle occupant, any subsequent take-up and/or dissipation of force comes from other components of the restraint system (e.g. it may come from an additional load-limiting device incorporated into the restraint system).

The present invention provides a new and useful belt-tensioning device for an occupant restraint, designed to tension a belt about an occupant at the onset of a vehicle collision, and which is also designed to provide a measure of force dissipation as the occupant begins to load the belt during the collision. Thus, the same structure that provides a belt-tensioning function also provides a load-limiting function that absorbs kinetic energy of an occupant in a controlled manner as the occupant loads the restraint during a collision.

In its preferred form, the present invention provides a tensioning member that moves in one direction to tighten a belt about a vehicle occupant, and a braking device configured to apply a controlled braking force to movement of the tensioning member in the opposite direction after the tensioning member has tightened the belt about the vehicle occupant. An array of braking members applies different levels of braking force to movement of the tensioning member in the opposite direction, thereby providing controlled displacement of the tensioning member in the opposite direction as the occupant loads the restraint during a collision.

These and other features of the present invention will become further apparent from the following detailed description and the accompanying drawings.

BRIEF DESCRIPTION OF THE DRAWINGS

FIG. 1 is a schematic view of an occupant restraint system with a tensioning device formed according to the principles of the present invention;

FIG. 3 is an exploded view of the components of FIG. 2 showing the tensioning device;

DETAILED DESCRIPTION OF THE DRAWINGS

Figure 2:
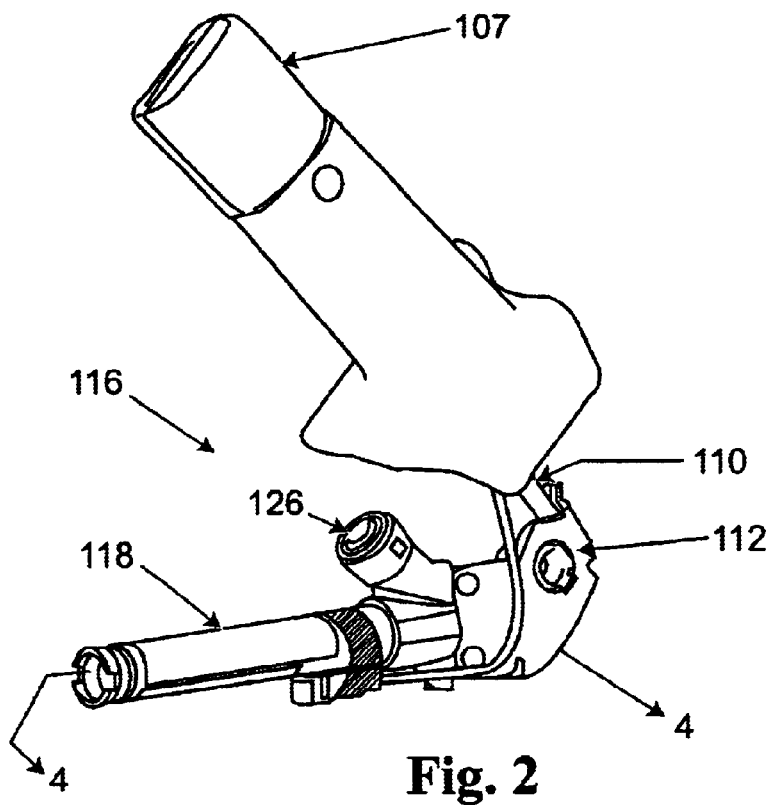
FIG. 2 is a perspective view of the part of an occupant restraint system in which a tensioning device according to the present invention is incorporated.

As discussed above, the present invention relates to a tensioning device for an occupant restraint, which applies a tensioning force and a measure of initial load-limiting capability to the occupant restraint during the onset and initial stages of a vehicle collision. The principles of the present invention are applicable to different configurations for an occupant restraint, and are described below in connection with a vehicle seat belt/shoulder harness. However, it will be clear to those in the art that the principles of the invention are applicable to a variety of occupant restraints (e.g. front and rear seat belts, other seat belt/shoulder harness configurations, etc.) and are applicable to occupant restraints anchored directly to a structural part of a vehicle (e.g. a vehicle floor, B pillar, etc.) and to vehicle restraints anchored to a vehicle seat.

FIG. 1 schematically illustrates an occupant restraint system 100, which incorporates a tensioning device 116 according to the present invention. In FIG. 1, the occupant restraint system 100 comprises a belt 101 that forms a lap belt 102 and a shoulder harness 103 designed to fit a vehicle passenger. The belt 101 is attached to a retractor 104 that is coupled to a structural part of a vehicle (e.g. the vehicle floor or, as illustrated, the vehicle B pillar). The retractor 104 allows controlled payout of the belt 101 as the occupant restraint is being fitted about a vehicle occupant. The belt 101 also includes a tongue 106, which can be connected to a buckle 107. The buckle 107 is coupled to an anchor 108 that connects the buckle with a structural part of the vehicle or seat.

Figure 4:
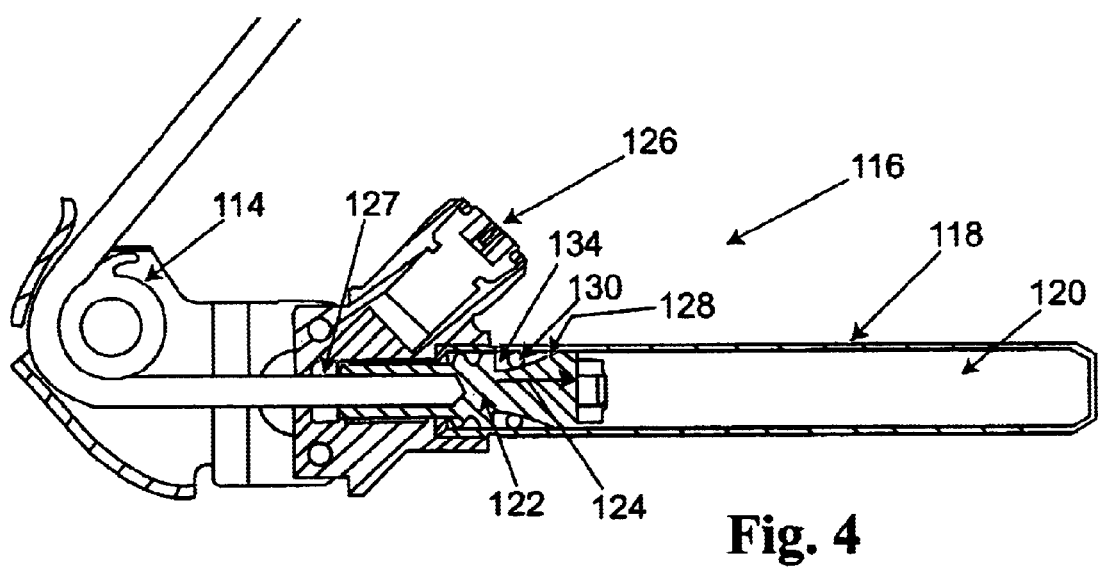
FIG. 4 is cross-sectional view of a part of the cylinder forming part of the tensioning device of FIG. 2, taken from the direction 4—4, in a condition prior to being activated during a collision.
Figure 5:
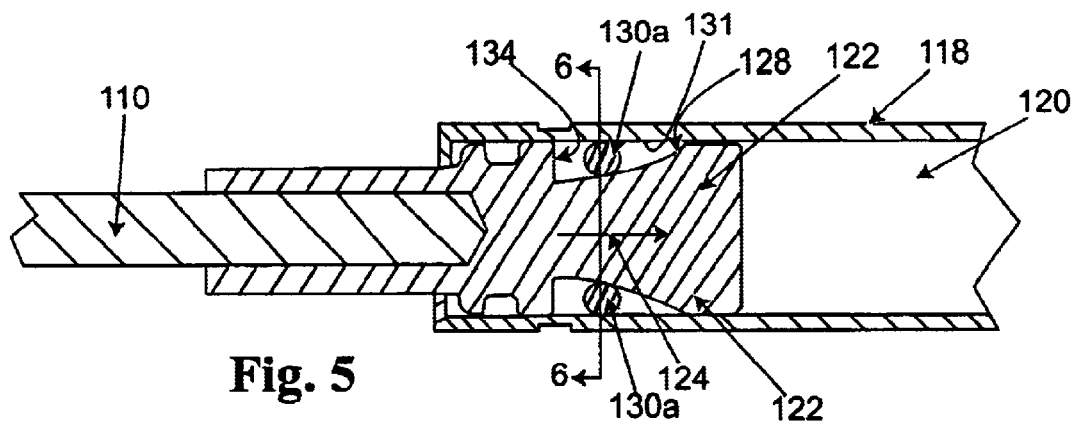
FIG. 5 is an enlarged view of a portion of the cylinder of FIG. 4, after the tensioning device has been activated during a collision.

As seen from FIGS. 2–4, the anchor 108 includes an anchor cable 110 connected to a coupling 113 fixed to the buckle and a metal bracket assembly 112 that anchors a pulley 114 for the cable 110 with a structural part of a vehicle (e.g. a vehicle seat or the vehicle floor). The end of the anchor cable 110 is coupled to a belt-tensioning device 116 constructed according to the principles of the present invention.

During normal vehicle operation, the retractor 104 may allow some limited slack in the belt 101, and may also allow some limited amount of belt payout, if the vehicle occupant shifts position in the vehicle. However, at the onset of a vehicle collision, the retractor 104 locks and prevents further belt payout, to provide a restraint on the vehicle occupant during the collision. The belt-tensioning device 116 of the present invention is designed to (a) initially take up any slack in the belt, to tighten the belt 101 about the occupant at the onset of a vehicle collision, and (b) subsequently function as a load-limiting device, which absorbs kinetic energy of the occupant in a controlled manner as the occupant loads the belt during the collision.

The belt-tensioning device 116 comprises a cylinder 118 having a chamber 120 (FIG. 4) and a piston 122, which can move linearly in the chamber 120. The piston 122 is coupled to the cable 110, so that movement of the piston 122 in the direction shown by arrow 124 (see FIG. 4) tightens the belt about a vehicle occupant. At the onset of a vehicle collision, a sensor (not shown) initiates a gas generator 126 (FIGS. 2–4) that rapidly directs high-pressure gas into a pressure chamber 127 on one side of the piston (see FIG. 4). The sensor and gas generator can be any of a number of known types of sensors and gas generators for sensing the onset of a collision and for initiating operation of a gas generator, and should not require further description to those skilled in the art.

The piston 122 includes a conical outer surface 128 and an annular array of braking members, which in the illustrated embodiment comprise an array of balls 130. The array of balls 130 is disposed on the outside of the conical outer surface 128. The array of balls 130 is maintained between the conical outer surface 128 and an inner wall 131 of the cylinder by a wall 134 on the piston. At the onset of a collision, when the piston 122 is driven in the direction of the arrow 124, the array of balls 130 moves linearly in the chamber 120 along with the piston 122. As the piston 122 is driven linearly in the chamber 120 it pulls the cable 110 in the same direction, and thereby causes the belt 101 to be rapidly tightened against a vehicle occupant.

Figure 7:
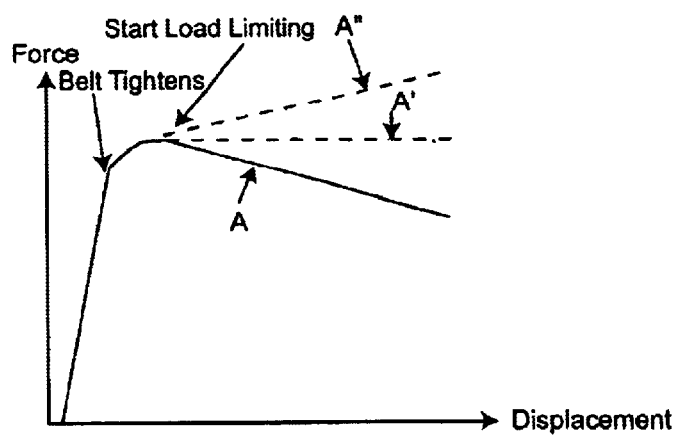
FIG. 7 is a graph that schematically illustrates the manner in which a tensioning device according to the present invention is designed to take up force during a vehicle collision.

According to the present invention, after the piston 122 moves in the direction 124 (FIG. 4) to tighten the belt 101 about a vehicle occupant, the braking device of the present invention is configured to apply a controlled braking force to movement of the piston in the opposite direction. The array of braking members 130 applies different levels of braking force to movement of the piston in the opposite direction, thereby providing controlled braking force to movement of the piston in the opposite direction. Accordingly, as the occupant loads the belt during the collision, the controlled displacement of the piston in the direction opposite to arrow 124 enables the tensioning device to provide a load-limiting function that absorbs kinetic energy of the occupant in a controlled manner during the collision. The force/displacement characteristics of a tensioning device according to the principles of the present invention are schematically illustrated in FIG. 7.

Figure 6:
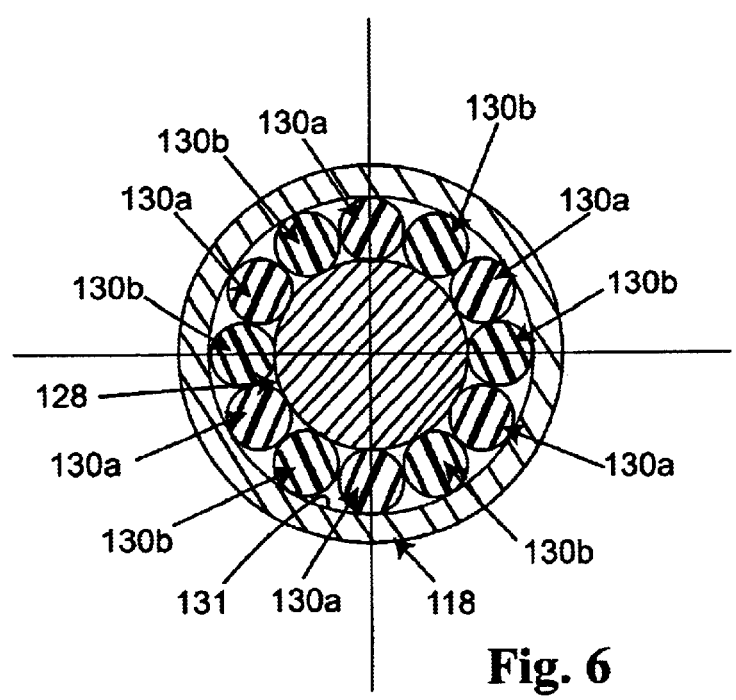
FIG. 6 is a cross-sectional view of the cylinder of FIG. 5, taken from the direction 6—6.

According to the disclosed embodiment, the composition of the balls 130, the configuration of the conical surface 128 and of the cylinder 120 are designed so that as the piston 122 has been driven in the direction of arrow 124 and then begins to move in the direction opposite to arrow 124 the balls 130 are forced radially outward relative to the conical surface 128 and into engagement with the inner wall 131 of the cylinder 120. The array of balls 130 provides different levels of braking engagement with the cylinder when the piston moves opposite to arrow 124. In the illustrated embodiment, the cylinder 120 and conical wall 128 are each formed of relatively hard metal (e.g. A2 tool steel that has been hardened to a Rockwell C of 65), and the array of balls 130 comprises balls 130a formed of relatively hard metal (e.g. A2 tool steel that has been hardened to a Rockwell C of 65), and balls 130b formed of relatively softer metal (e.g. brass or 1010 to 1020 mild steel) or of a plastic material. Also, as particularly shown in FIG. 6, the balls 130b formed of softer metal or of plastic material are disposed between the harder metal balls 130a about the periphery of the conical surface 128.

The foregoing structure results in different levels of braking engagement between the balls 130a, 130b and the cylinder 118, as forces on the piston 122 seek to move it in a direction opposite to arrow 124. Thus, after the piston 122 is driven in the direction 124, and has tensioned the belt about the vehicle occupant, as the occupant continues to load the belt, and those forces are transmitted to the piston tending to move it in the direction opposite to arrow 124, the braking members 130a, 130b are wedged between the conical surface 128 and the cylinder wall 131, and provide predetermined resistance to movement of the piston in the direction opposite to arrow 124. Such predetermined resistance is designed so that the piston 122 is not completely locked against movement opposite to arrow 124. Rather, they provide different levels of resistance to such movement in a manner that allows some degree of movement opposite to arrow 124, but to a controlled extent and in a controlled manner. Thus, in addition to providing a belt tightening function, the tensioning device 116 provides a load limiting function, which allows controlled slippage of the piston in a direction opposite arrow 124, and thereby allows absorption of the kinetic energy of the occupant in a controlled manner during the collision. FIG. 7 schematically illustrates the force/displacement characteristics of a tensioning device according to the present invention, as the tensioning device absorbs the kinetic energy of a vehicle occupant during a collision. In FIG. 7, the solid line "A" illustrates an example of a force/displacement characteristic for a tensioning device according to the present invention.

The foregoing structure of a tensioning device, according to the present invention, also allows the load-limiting characteristics of the tensioning device to be controlled. For example, as discussed above, the balls 130a may be made of hard metal and the balls 130b may be made of softer metal or of plastic. Since softer metal and plastic are likely to have different braking engagement characteristics with the cylinder wall, the load-limiting characteristics of the tensioning device would be different if the balls 130b are made of soft metal than it would be if the balls 130b are made of plastic. Moreover, the load-limiting characteristics of the tensioning device can be controlled by interspersing spacer elements that perform no braking function between the balls of the harder material. Thus, the amount and material of the harder balls determines the braking characteristics of the device and the spacers function only to provide appropriate spacing between the harder balls for even distribution of the braking force(s) about the periphery of the piston. In addition, the material(s), shape(s) and dimension(s) of the piston and the cylinder can also be configured to configure the load limiting characteristics of the tensioning device. In FIG. 7, the dashed lines A' and A" schematically illustrate other force/displacement characteristics that can be designed in a tensioning device according to the invention by controlling the load-limiting characteristics of the tensioning device in the manner described above.

Accordingly, the foregoing disclosure provides a new and useful belt-tensioning device for an occupant restraint, designed to tension a belt about an occupant at the onset of a vehicle collision, and which is also designed to provide a measure of force dissipation as the occupant begins to apply a force (or load) to the belt during the collision. Such force dissipation produces some measure of load-limiting capability to the belt-tensioning device during the vehicle collision, and thereby provides an additional measure of absorption of the kinetic energy of the occupant during the collision. Moreover, the present invention provides a tensioning device in which the load limiting characteristics of the tensioning device can be selectively controlled. With the foregoing disclosure in mind, there will be other modifications and developments that will be apparent to those in the art.

What is claimed is:

1. An apparatus comprising a tensioning device (116) for an occupant restraint, the tensioning device comprising a tensioning member (122) which is connected with the occupant restraint in a manner such that the tensioning member is moveable in a first direction (124) to tighten the occupant restraint about an occupant and a second direction when the occupant loads the occupant restraint, the tensioning member comprising a piston supported for movement in a cylinder in the first and second directions, the tensioning device including an array of braking members (130) disposed between the piston and the cylinder, the piston and the braking members configured to cause the braking members to be forced into engagement withn the cylinderand to provide controlled slippage between the piston and the cylinder when the piston moves in the second direction;

wherein the array of braking members comprises first and second braking members, (130a, 130b) which provide different levels of braking force between the piston and the cylinder when the piston moves in the second direction.

2. The apparatus as defined in claim 1, wherein the cylinder (118) is formed of metal, the first braking members (130a) are formed of a first metal having a predetermined first hardness, and the second braking members (130b) are formed of a material different from the first metal and having a hardness different from the first braking members.

3. The apparatus as defined in claim 2, wherein the second braking members (130b) are formed of a plastic material and the second braking members are disposed between the first braking members (130a) about the periphery of the piston.

4. The apparatus as defined in claim 2, wherein the second braking members (130b) are formed of a metal with a different hardness than the first metal and the second braking members are disposed between the first braking members about the periphery of the piston.

* * * * *